(12) United States Patent
Nishioka et al.

(10) Patent No.: US 7,889,611 B2
(45) Date of Patent: Feb. 15, 2011

(54) MEDIA PROCESSOR CAPABLE OF EFFICIENTLY DISCARDING MEDIA

(75) Inventors: Atsushi Nishioka, Shiojiri (JP); Kenichiro Arai, Shiojiri (JP); Koichi Ebina, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 648 days.

(21) Appl. No.: 11/910,053

(22) PCT Filed: Mar. 27, 2006

(86) PCT No.: PCT/JP2006/306071
§ 371 (c)(1),
(2), (4) Date: Sep. 28, 2007

(87) PCT Pub. No.: WO2006/104066
PCT Pub. Date: Oct. 5, 2006

(65) Prior Publication Data
US 2008/0273433 A1    Nov. 6, 2008

(30) Foreign Application Priority Data
Mar. 29, 2005    (JP)  ................... P2005-094790

(51) Int. Cl.
*G11B 11/00*    (2006.01)
(52) U.S. Cl. ............... 369/53.15; 369/30.34; 369/30.77
(58) Field of Classification Search ........................ None
See application file for complete search history.

(56) References Cited
U.S. PATENT DOCUMENTS
4,467,214 A    8/1984    Ito et al.
5,181,081 A    1/1993    Suhan
5,640,535 A    6/1997    Suzuki et al.

(Continued)

FOREIGN PATENT DOCUMENTS
JP    10-214424    8/1998

(Continued)

OTHER PUBLICATIONS
Machine translation of JP 2002-316321, published Oct. 29, 2002.*

*Primary Examiner*—Paul Huber
(74) *Attorney, Agent, or Firm*—Nixon & Vanderhye P.C.

(57) ABSTRACT

A media processor, such as an optical disk publisher, is capable of efficiently discarding media such as a defective CD without using a manual discarding process. At the time of media publication of an optical disk publisher 5, blank media 14 stored in a supply-side stacker 13 is taken out by a media conveying mechanism 12 and is conveyed to a media drive 15, and predetermined data is written into the blank media 14. Printing is performed on printing surfaces of the media into which data has been normally written by means of a label printer 19. The published media is stored in a storage-side stacker 22. Defective media on which a failure in writing has occurred is disposed of so as not to be readable by mechanically destroying a recording surface of the defective media by means of a media disposal mechanism while moving the defective media in a state where the defective media is mounted on a media tray 71 of a printer 19. Discarded media after the disposal is ejected from a media outlet 25.

14 Claims, 10 Drawing Sheets

U.S. PATENT DOCUMENTS

| | | |
|---|---|---|
| 5,734,629 A | 3/1998 | Lee et al. |
| 5,914,918 A | 6/1999 | Lee et al. |
| 5,956,311 A | 9/1999 | Kawai |
| 6,222,800 B1 | 4/2001 | Miller et al. |
| 6,400,659 B1 | 6/2002 | Kitaoka |
| 7,028,216 B2 | 4/2006 | Aizawa et al. |

FOREIGN PATENT DOCUMENTS

| | | |
|---|---|---|
| JP | 11-57683 | 3/1999 |
| JP | 2000-155949 | 6/2000 |
| JP | 2000-260172 | 9/2000 |
| JP | 2002-316321 | 10/2002 |
| JP | 2003-77138 | 3/2003 |
| JP | 2004-62964 | 2/2004 |

* cited by examiner

MEDIA PROCESSOR CAPABLE OF EFFICIENTLY DISCARDING MEDIA

This application is the U.S. national phase of International Application No. PCT/JP2006/306071 filed 27 Mar. 2006 which designated the U.S. and claims priority to Japanese Patent Application No. 2005-094790 filed 29 Mar. 2005, the entire contents of each of which are hereby incorporated by reference.

TECHNICAL FIELD

The present invention relates to a media processor, such as an optical disk publisher including a CD/DVD publisher and an optical disk duplicator, and in particular, to a media processor suitable for preventing data from leaking out in the case of writing and duplicating secret data.

BACKGROUND ART

In general, an optical disk publisher, such as a CD/DVD publisher, supplies a blank CD or the like stored in a blank media stacker to a built-in CD drive and writes predetermined data into the CD. In addition, after writing the predetermined data into the CD, a label or the like is printed on a printing surface of the CD by a built-in printer, and thus the CD is published. For example, Patent Document 1 discloses such publisher.

Here, for example, in the case of publishing a CD-R, a defective CD is discarded if a failure occurs when writing data into the CD-R using a CD drive or if a printing failure occurs, for example, the label print position shifts at the time of label printing on a printing surface of the CD-R. When written data is secret data, for example, a defective CD needs to be disposed of by a CD disposal machine called a shredder or a crusher so that data is not readable and then is discarded. Various kinds of CD disposal machines have been proposed, for example, as disclosed in Patent Documents 2 to 4.

Patent Document 1: U.S. Pat. No. 5,914,918
Patent Document 2: JP-A-2004-62964
Patent Document 3: JP-A-10-214424
Patent Document 4: JP-A-2002-316321

DISCLOSURE OF THE INVENTION

Problems to be Solved by the Invention

In the related art, if a CD published by a CD publisher is defective, it is common that an operator puts the defective CD in a shredder or a crusher in order to discard the defective CD. However, in the case of performing processing for manually discarding the defective CD, there is a high risk that secret data will leak out. Moreover, the processing for manually discarding the defective CD is not efficient, and there is also a risk that a CD may be mistakenly discarded. In addition, when duplicating a plurality of CDs, there is a high risk that data will leak out since, for example, the number of discarded CDs cannot be correctly managed.

In view of the above problems, it is an object of the present invention to provide a media processor, such as an optical disk publisher, capable of efficiently discarding media such as a defective CD without using a manual discarding process.

Means for Solving the Problem (1) A media processor comprising:
a media drive that performs writing of data and reading of data on plate-shaped media;
a defective media detection unit that detects defective media on which a failure in data writing is performed by the media drive;
a media disposal mechanism that disposes of the defective media such that data is not readable from the defective media;
a media conveying mechanism for conveying the media; and
a control unit that controls the media drive, the media disposal mechanism, and the media conveying mechanism,
wherein the media disposal mechanism disposes of the defective media when the defective media is detected.

(2) The media processor according to (1), further comprising:
a media outlet for ejecting media,
wherein writing-completed media into which data has been normally written is published from the media outlet, and discarded media disposed of by the media disposal mechanism is ejected from the media outlet.

(3) The media processor according to (1) or (2), further comprising:
a printer that performs printing on media surfaces,
wherein the printer performs printing on media on which data writing has been normally performed.

(4) The media processor according to any one of (1) to (3), further comprising:
a first media stacker, a second media stacker, and a discarded media stacker for respectively storing media.

(5) The media processor according to (4), wherein the control unit makes a control such that the media drive writes data into media stored in the first media stacker, the defective media detection unit determines whether or not media after the data writing is defective media, and the media conveying mechanism causes normal media on which data writing has been normally performed to be stored in the second media stacker and causes the defective media to be disposed of by the media disposal mechanism and then stored in the second media stacker.

(6) The media processor according to (4) or (5), wherein the control unit makes a control such that the media drive writes data into media stored in the first media stacker, the defective media detection unit determines whether or not media after the data writing is defective media, and the media conveying mechanism causes normal media on which data writing has been normally performed to be stored in the second media stacker and causes the defective media to be disposed of by the media disposal mechanism and then ejected as discarded media from the media outlet.

(7) The media processor according to any one of (4) to (6), wherein the control unit makes a control such that the media disposal mechanism disposes of media stored in one of the first and second media stackers, and the media conveying mechanism causes discarded media after the disposal to be ejected from the media outlet.

(8) The media processor according to any one of (4) to (7), wherein the control unit makes a control such that the media disposal mechanism disposes of media stored in one of the first and second media stackers, and the media conveying mechanism causes discarded media after the disposal to be stored in the other one of the first and second media stackers.

(9) The media processor according to any one of (4) to (8), wherein the control unit makes a control such that the media drive writes data into media stored in one of the first and second media stackers, the defective media detection unit determines whether or not media after the data writing is defective, and the media conveying mechanism causes the normal media to be stored in the other one of the first and second media stackers and causes the defective media to be disposed of by the media disposal mechanism and then stored in the discarded media stacker.

(10) The media processor according to any one of (1) to (9), wherein the media disposal mechanism is a mechanism that destroys a data recording layer of media using an optical means, a chemical means, a mechanical means, or a means obtained by combination thereof.

(11) The media processor according to any one of (3) to (10), wherein the media disposal mechanism is a mechanism that performs printing on data-reading-side surfaces of media so as not to be readable.

(12) The media processor according to any one of (1) to (11), wherein the media disposal mechanism is a mechanism that destroys data-reading-side surfaces of media using a chemical means, a mechanical means, or a means obtained by combination thereof.

(13) The media processor according to (10) or (12), wherein the media disposal mechanism disposes of media using a motion of a movable part of the media drive or the media conveying mechanism.

(14) The media processor according to any one of (3) to (10) and (12), wherein the media disposal mechanism mechanically disposes of media using a motion of a movable part of the printer.

(15) The media processor according to any one of (3) to (9), wherein the control unit causes at least one of (1) the media drive to perform an operation of writing media identification information and (2) the printer to perform an operation of printing the media identification information and storing or outputting to the outside, media identification information which is assigned to media disposed of by the media disposal mechanism.

Specifically, the media processor of the present invention is characterized by providing the media drive that performs writing of data and reading of data on plate-shaped media, such as a CD or a DVD, the defective media detection unit that detects defective media on which a data writing failure or the like occurs, the media disposal mechanism that disposes of the defective media such that data is not readable from the defective media, the media conveying mechanism for conveying the media, and the control unit that controls driving of the media drive, the media disposal mechanism, and the media conveying mechanism, and the media disposal mechanism disposes of the defective media when the defective media is detected.

In the media processor of the present invention, the media disposal mechanism is provided. Accordingly, when the data writing failure or the like occurs, such defective media is disposed of inside the apparatus so as not to be readable without being taken out to the outside and then discarded after the disposed of media is ejected. Accordingly, in the case of making a plurality of media such as a CD into which secret data or the like is written, defective media does not flow to the outside, such that secret data does not leak out. In addition, since an operator does not need to put defective media in a shredder or a crusher in order to discard the defective media, it is possible to efficiently perform processing for discarding the defective media.

Further, the present invention is characterized in that a media outlet for ejecting media is further provided in addition to the configuration described above, and writing-completed media into which data has been normally written is published from the media outlet, and discarded media disposed of by the media disposal mechanism is ejected from the media outlet.

In general, the media processor includes a first media stacker in which blank media and the like are stored, a second media stacker in which creation-completed media or the like is stored, and a discarded media stacker in which disposal-completed media to be discarded is stored.

In this case, the present invention is characterized in that the control unit may execute at least one of the following first to fifth processing modes.

In the first processing mode, the media drive writes data into media stored in the first media stacker, the defective media detection unit determines whether or not media after the data writing is defective media, and normal media on which data writing has been normally performed is stored in the second media stacker, and the defective media is disposed of by the media disposal mechanism and then stored in the second media stacker.

In the second processing mode, the media drive writes data into media stored in the first media stacker, the defective media detection unit determines whether or not media after the data writing is defective media, and normal media on which data writing has been normally performed is stored in the second media stacker, and the defective media is disposed of by the media disposal mechanism and then ejected as discarded media from the media outlet.

In the third processing mode, the media disposal mechanism disposes of media stored in one of the first and second media stackers, and discarded media after the disposal is ejected from the media outlet.

In the fourth processing mode, the media disposal mechanism disposes of media stored in one of the first and second media stackers, and discarded media after the disposal is stored in the other one of the first and second media stackers.

In the fifth processing mode, the media drive writes data into media stored in one of the first and second media stackers, the defective media detection unit determines whether or not media after the data writing is defective, and normal media is stored in the other one of the first and second media stackers, and the defective media is disposed of by the media disposal mechanism and then stored in the discarded media stacker.

In the third and fourth processing modes, the media processor functions as a crusher or a shredder in the related art, and it is possible to collectively discard a plurality of defective media.

The media processor of the present invention may be configured to include a printer that performs label printing or the like on surfaces of media. By providing the printer, it is possible to realize data writing and label printing indicating contents of data in one media processor.

In this case, by causing the printer to perform printing on media on which data writing has been normally performed, it is possible to prevent printing on defective media.

Here, as the media disposal mechanism, it may be possible to adopt a mechanism that destroys a data recording layer of media using an optical means, a chemical means, a mechanical means, or a means obtained by combination thereof.

In addition, as the media disposal mechanism, it may be possible to adopt a mechanism that destroys data-reading-side surfaces of media using a chemical means, a mechanical means, or a means obtained by combination thereof.

As the chemical means, for example, it may be possible to use a head that illuminates a laser beam with an intensity enough to destroy a data recording surface. Moreover, laser beams of the media drive may also be used. As the chemical means, a method of coating special ink on a media surface and dissolving the data recording surface may be adopted. In addition, a method of making a protective layer of the data recording surface opaque by causing a heat roller or the like to be pressed against the media surface or a method of thermally changing or melting the data recording surface may also be used. As the mechanical means, a method of damaging or punching data recording surfaces of media may be adopted.

Furthermore, a mechanism that performs printing on data-reading-side surfaces of media so as not to be readable may also be adopted.

Furthermore, as such media disposal mechanism, it is possible to adopt the configuration in which media can be disposed of using a motion of a movable part of the media drive, the media conveying mechanism, or the printer. For example, it is possible to use a mechanical means for pressing a protrusion against the media, which is mounted on a media tray of a media drive, when the media tray of the media drive comes in and out. Moreover, when a printer is provided, it is possible to use a mechanism in which a protrusion, a heat roller, and the like are mounted in a head carriage of the printer. In addition, a protrusion and the like may also be provided in a media conveying mechanism. In this manner, since the media disposal mechanism can have a small and compact configuration, the present invention is advantageous in making an apparatus small and compact and reducing cost.

In addition, in order to manage media to be discarded, preferably, the control unit causes the media drive to perform an operation of writing media identification information and/or the printer to perform an operation of printing the media identification information and storing media identification information, which is granted to media disposed of by the media disposal mechanism, or outputting the media identification information to the outside.

Effects of the Invention

As described above, the media processor of the present invention has a function of publishing media written with data or media on which data writing and label printing are performed and a media disposal function of discarding defective media. Therefore, defective media into which secret data and the like are written can be discarded without using a manual discarding process. As a result, it is possible to reliably prevent leakage of data occurring in a case when defective media to be discarded is taken out to the outside. In addition, since defective media is disposed of in a media publication process, defective media can be efficiently disposed of as compared with a known case in which defective media is manually disposed of.

Furthermore, in the case when a method of performing a disposal operation using a movable part of a media drive, a printer, or the like is adopted as the media disposal mechanism, it is possible to make the media disposal mechanism small and compact. In addition, since a dedicated driving source is not required, the present invention is advantageous in making the entire apparatus small and compact and reducing cost.

In addition, since defective media that has been disposed of can be managed on the basis of media identification information, it is possible to reliably manage the number of discarded media at the time of media publication, which is convenient.

BEST MODE FOR CARRYING OUT THE INVENTION

Hereinafter, an embodiment of a data management system using a media processing device to which the present invention is applied will be described with reference to the accompanying drawings.

(Data Management System)

FIG. 1 is a view schematically illustrating the configuration of a data management system according to the present embodiment, for example, the configuration of a data management system applied to a LAN within a company.

In the present embodiment, an optical disk publisher 5 has a function of an optical disk crusher for causing data not to be readable from an optical disk, such as a CD or a DVD. Moreover, a storage device 6 for storing a CD or a DVD (media) into which writing has been completed may be connected to the optical disk publisher 5. In the present embodiment, an explanation will be made assuming that the storage device 6 is built in the optical disk publisher 5.

A client PC 3 basically has the same configuration as a PC (personal computer) that is generally used. The client PC 3 is connected to an input device 3A, such as a keyboard and a mouse, and a display device 3B, such as a display. In the present embodiment, the client PC 3 does not include mass storage media such as a hard disk drive for storing and holding created data and the like, does not include a writing driver for writing data into an optical disk or a magnetic disk, and does not have a data output function such as a printer driver for outputting data to a printer. Therefore, data may be output to the display device 3B but cannot be output from the client PC 3 to the outside of an in-company LAN 2 by other means.

Data created in each client PC 3 is supplied to a management server 4 through the in-company LAN 2, such that the data is managed in a unified manner by the management server 4. In addition, login from each client PC 3 is permitted on the basis of a user ID and a password granted beforehand to a user (employee) or a user ID and biometric information granted beforehand to a user (employee).

The management server 4 is a server that manages each client PC 3 through the in-company LAN 2. The management server 4 includes a storage device such as a hard disk drive for storing data created in each client PC 3. Data created in each client PC 3 is supplied to the management server 4 through the in-company LAN 2 and stored in a hard disk drive, such that the data is managed in a unified manner by the management server 4. In addition, at the time of login from each client PC 3, the management server 4 permits the login on the basis of a user ID and a password granted beforehand to a user (employee) or a user ID and biometric information granted beforehand to a user (employee).

Moreover, the hard disk within the management server 4 is provided with a database DB managed in a unified manner. In the management server 4, the data created in each client PC 3 is stored in an access-restricted state. The management server 4 sets an access level for every user ID used to log in the client PC 3 and permits reading, writing, and the like of data corresponding to the access level.

In addition, if the management server 4 receives from the client PC 3 a data output request that instructs data, which is recorded in the database DB within the management server 4, to be output to the outside of the in-company LAN 2 through the optical disk publisher 5, the management server 4 waits for the approval (issue of a password) of a boss (client PC 3 operated by a boss from the point of view of hardware) and permits the system to make an optical disk (hereinafter, an explanation will be made using a CD (CD 8) as an optical disk) into which requested data is written. In addition, the management server 4 records CD publication/disposal history information on the database DB when the CD 8 is published or disposed of. The CD publication/disposal history information includes an ID of a published CD, information for specifying data written into the CD, date of publication, a user ID that requested the publication, date of disposal, and the like.

As shown in FIG. 2, the optical disk publisher 5 includes a writing drive for writing data into a CD or a DVD, a printing mechanism (for example, a label printing mechanism 55 to be described later) for printing an image on a label surface of a CD, and the like. Further, the optical disk publisher 5 includes an individual authentication unit configured by using a biometric recognition device, an ID card reader, a ten key input, and the like, such that the CD 8 is published for only a specific user. The optical disk publisher 5 is connected to the optical disk storage device 6 through a mechanism, such as a disk changer, such that a part of the data stored in the database DB of the management server 4 can be written into the CD 8, and the CD 8 can be stored in the storage device 6.

(Optical Disk Publisher)

FIG. 2 is a view schematically illustrating the configuration of the optical disk publisher 5.

The optical disk publisher 5 includes a control unit 11 connected to the in-company LAN 2. The control unit 11 is a central control unit that controls an operation of each unit, which will be described later, within the optical disk publisher 5, and an operation of publishing the CD 8 is performed under the control of the control unit 11. Specifically, the optical disk publisher 5 includes: a supply-side stacker 13 in which a plurality of blank CDs 14, on which data writing processing is not performed, can be stacked; a media drive 15 that performs writing of data into the blank CD 14; a label printer 19 that writes an image on a label surface of a CD; a media disposal mechanism 23 that processes a CD such that data is not readable; a storage-side stacker 22 in which CDs, on which writing is completed, are stacked; a disposal stacker 27 in which CDs processed not to be readable are temporarily stacked; and a media conveying mechanism 12 that conveys a CD. Those described above operate under the control of the control unit 11.

An operation of the optical disk publisher 5 will be specifically described. When a CD control request is received from a predetermined client PC 3 through the in-company LAN 2, the blank CD 14 stacked in the supply-side stacker 13 is taken out by the media conveying mechanism 12 and is then set in the media drive 15. Then, the media drive 15 writes data supplied through the in-company LAN 2 into the blank CD 14. The written data includes identification information on the CD 14.

As for a writing-completed CD 16 after data is written, an inspection on whether or not the data writing has been normally performed by the media drive 15 is performed under the control of the control unit 11, such that a normally written CD 17 and a defective CD 18 are separated. In this example, the control unit 11 and the media drive 15 form a defect media detection unit. Thereafter, the CD 17 or CD 18 is taken out from the media drive 15 by the media conveying mechanism 12 and is supplied to the ink jet type label printer 19.

With a normally written CD 17, CD identification information is printed on a label surface together with a predetermined label pattern by the label printer 19. A CD 20 after printing is taken out from the label printer 19 by the media conveying mechanism 12 and is temporarily stacked in the storage-side stacker 22. The identification information of the stacked CD 20 and an ID of a user who requested manufacturing of the CD 20 are stored in the database DB of the management server 4 in a state in which the identification information of the stacked CD 20 and the ID of the user who requested manufacturing of the CD 20 correspond to each other.

In contrast, with a defective CD 18, a data recording surface is broken by the media disposal mechanism 23 provided in the label printer 19, such that the defective CD 18 is disposed of so as not to be readable. After the disposal, a CD 24 to be discarded is stacked in the stacker 27 for discarded media. In addition, the CD 24 to be discarded may be conveyed to a media outlet 25 by the media conveying mechanism 12, such that the CD 24 to be discarded is ejected.

When disposing of the defective CD 18, CD identification information of the CD 18 is supplied to the management server 4 through the in-company LAN 2, and it is checked whether or not the defective CD 18 is a CD to be disposed of. If a permission of disposal is granted from the management server 4, the CD 18 is disposed of. At this time, the optical disk publisher 5 transmits disposal history information on the CD 18 (CD identification information, disposal date, and the like) to the management server 4. Thus, the disposal history information is stored in the management server 4.

Furthermore, the optical disk publisher 5 includes an individual authentication unit 26 configured by using a biometric recognition device, an ID card reader, a ten key input, and the like. In order to take out the CD 20, into which data is written, from the media outlet 25 of the optical disk publisher 5, a user inputs a user ID and a password granted beforehand to the user or a user ID and biometric information granted beforehand to the user using a ten key, a card reader, or a biometric recognition device provided in the individual authentication unit 26. If the authentication succeeds through the individual authentication unit 26, CD identification information corresponding to the user ID is searched, the corresponding CD 20 is taken out from the storage-side stacker 22 by means of the media conveying mechanism 12, and the corresponding CD 20 is conveyed to the media outlet 25 to be output. Thus, a CD is published for the user. At this time, the optical disk publisher 5 transmits publication history information on the CD to the management server 4. Thus, the publication history information is stored in the management server 4.

(Specific Example of the Configuration of an Optical Disk Publisher)

FIG. 3 is a perspective view illustrating an outer appearance of the optical disk publisher 5.

The optical disk publisher 5 includes a housing 31 having approximately a rectangular parallelepiped shape. Doors 32 and 33 that can be opened and closed left and right are provided on a front face of the housing 31. An operation surface 34 on which a display lamp, an operation button, and the like are arranged is formed on a lower right end part of the doors 32 and 33, and the media outlet 25 is open in the vicinity of the operation surface 34.

FIG. 4 is a perspective view illustrating the optical disk publisher 5 in a state where the doors 32 and 33 are opened.

The left door 32 is locked in a closed state, and a read part for biometric recognition of the individual authentication unit 26, for example, a fingerprint sensor, is provided on the operation surface 34 so that the left door 32 can be opened and closed by only a person registered in advance. In addition, the left door 32 may be opened and closed by a command from the management server 4. In contrast, the right door 33 is opened and closed at the time of replacement of an ink cartridge of the label printer 19, and a cartridge mounting part 36 is exposed if the door 33 is opened. In this example, the cartridge mounting part 36 having two upper and lower stages is formed.

FIG. 5 is a perspective view illustrating the optical disk publisher 5 in a state where a part of the housing 31 and the doors 32 and 33 are removed.

An explanation will now be made with reference to FIGS. 4 and 5. In a left part inside the housing 31 of the optical disk publisher 5, the supply-side stacker 13 and the storage-side stacker 22 are coaxially disposed above and below each other. The supply-side stacker 13 includes a slide plate 41, which can be horizontally pulled ahead, and a pair of left and right casing boards 42 and 43 that are vertically disposed on the slide plate 41 and have a circular arc shape. Thus, a stacker stores CDs placed from the upper side stacked in a coaxial state. An operation of placing CDs in the supply-side stacker 13 or filling up the supply-side stacker 13 with CDs may be simply performed by opening the door 32 and pulling out the slide plate 41 to the front.

The lower storage-side stacker 22 also has the same structure as described above. That is, the storage-side stacker 22 includes a slide plate 44, which can be horizontally pulled ahead, and a pair of left and right casing boards 45 and 46 that are vertically disposed on the slide plate 44 and have a circular arc shape. Thus, a stacker stores CDs placed from the upper side stacked in a coaxial state The media conveying mechanism 12 is disposed behind the supply-side stacker 13 and the storage-side stacker 22. The media conveying mechanism 12 includes: a chassis 51 vertically provided on the housing 31; a vertical guide shaft 54 that is vertically provided between upper and lower horizontal supporting plate portions 52 and 53 of the chassis 61; and a media carrier 55 provided on the vertical guide shaft 54. The media carrier 55 can move up and down along the vertical guide shaft 54 and rotate left and right around the vertical guide shaft 54.

Beside the upper and lower stacker 13 and 22 and the media conveying mechanism 12, the media drive 15 is disposed at an upper side and the label printer 19 is disposed at a lower side. The media drive 15 has a media tray 71 that is movable between a CD data writing position and a media delivery position at which a CD is received and delivered. In addition, the label printer 19 has a media tray 81 that is movable between a printing position at which label printing on a label surface of a CD is possible, and a media delivery position at which a CD is received and delivered.

In FIGS. 4 and 5, a state in which the media tray 71 of the upper media drive 15 is pulled ahead to be at a media delivery position 71A and a state in which the media tray 81 of the lower label printer 19 is at a media delivery position 81A on the front side is shown. Moreover, the label printer 19 is an ink jet printer, and ink cartridges 82 corresponding to respective colors are used as an ink supply source. These cartridge ink cartridges 82 are mounted in a cartridge mounting part 36 from the front side.

Here, a gap is formed between the pair of left and right casing boards 42 and 43 of the supply-side stacker 13 and between the pair of left and right casing boards 45 and 46 of the storage-side stacker 22. The gap allows the media carrier 55 of the media conveying mechanism 12 to move up and down. Furthermore, between the upper and lower stackers 13 and 14, a gap is formed such that the media carrier 55 can rotate horizontally to be positioned right above the stacker 14.

In addition, the media carrier 55 of the media conveying mechanism 12 can move downward so as to access the media tray 81 existing at the media delivery position if the upper media tray 71 is pushed into the media drive 15. Thus, it is possible to convey a CD to each portion through an operation based on a combination of rising and falling and leftward and rightward rotation of the media carrier 55.

FIG. 6 is a cross-sectional view schematically illustrating the optical disk publisher 5 taken along the line VI-VI of FIG. 4.

As shown in FIG. 6, the disposal stacker 27 used to store a CD to be discarded is disposed below the media tray 81. For example, about 30 CDs to be discarded may be stored in the disposal stacker 27. When the media tray 81 retreats from the media delivery position 81A above the disposal stacker 27 to the data writing position, a CD to be discarded may be supplied to the disposal stacker 27 by means of the media conveying mechanism 12.

A CD is thus conveyed among the supply-side stacker 13, the storage-side stacker 22, the disposal stacker 27, the media tray 71 of the media drive 15, and the media tray 81 of the label printer 19 through the media conveying mechanism 12.

(Media Conveying Mechanism)

FIG. 7 is a perspective view illustrating only the media conveying mechanism 12.

As described earlier, the media conveying mechanism 12 includes the chassis 51 vertically provided on the housing 31. The vertical guide shaft 54 is provided between the upper and lower horizontal supporting plate portions 52 and 53 of the chassis 51. The media carrier 55 is supported on the vertical guide shaft 54 so as to be able to move up and down and rotate.

An up-and-down mechanism of the media carrier 55 has a motor 56 serving as a driving source. Rotation of the motor 56 is transmitted to a driving-side pulley 61 through a speed reduction gear train including a compound transmission gear 58, a transmission gear 59, and a pinion 57 provided on a motor output shaft. The driving-side pulley 61 is supported so as to be free to rotate around a horizontal rotation shaft (not shown) in the position near an upper end of the chassis 51. In the position near a lower end of the chassis 51, a driven-side pulley 63 is supported so as to be rotatable around a rotation shaft 62, which is also horizontal in the same manner as the above rotation shaft. A timing belt 64 is stretched over between the driving-side pulley 61 and the driven-side pulley 63. A rear end portion of the media carrier 55 is fixed to one of left and right parts of the timing belt 64. Accordingly, when the motor 56 is driven, the timing belt 64 moves in the up and down directions, and the media carrier 55 attached to the timing belt 64 moves up and down along the vertical guide shaft 54.

A rotary mechanism of the media carrier 55 has a motor 65 serving as a driving source, and a pinion (not shown) is provided on an output shaft of the motor 65. Rotation of the pinion is transmitted to a fan shaped final-stage gear 69 through a speed reduction gear train including two compound transmission gears 66 and 67. The fan shaped final-stage gear 69 may rotate left and right around the vertical guide shaft 54. Moreover, the chassis 51 on which constituent components of the up-and-down mechanism of the media carrier 55 are assembled is mounted on the fan shaped final-stage gear 69. When the motor 65 is driven, the fan shaped final-stage gear 69 rotates left and right, and accordingly, the chassis 51 mounted on the fan shaped final-stage gear 69 rotates left and right around the vertical guide shaft 54 as one body with the fan shaped final-stage gear 69. As a result, the media carrier 55 held by the up-and-down mechanism mounted on the chassis 51 rotates left and right around the vertical guide shaft 54.

In addition, the media carrier 55 includes, for example, three holding pawls at the center of a front-end portion, and one of the three holding pawls can move in the radial direction. A CD can be held by inserting the holding pawls in a center hole of the CD and moving one of the holding pawls in a radially outward direction. By moving one of the holding pawls in a radially inward direction in the holding state, the CD can be released and fall down from the holding pawls. Such holding mechanism is mounted on the media carrier 55. Such holding mechanism is the same as a holding mechanism provided in the media tray 81 of the printer 15 to be described later.

(Label Printer)

FIG. 8 is a perspective view illustrating only the label printer 19, and FIG. 9 is a plan view illustrating the media tray 81.

The label printer 15 includes a chassis 83, and a carriage guide shaft 84 is provided horizontally between left and right side plates located on a rear side of the chassis 83. A head carriage 85 on which an ink jet head (not shown) is mounted can reciprocate in the left and right direction along the carriage guide shaft 84. A carriage driving mechanism includes a timing belt 86 that is provided horizontally in the left and right direction and a carriage motor 87 for driving the timing belt 86.

A nozzle surface of the ink jet head mounted on the head carriage 85 faces downward, and the media tray 81 can reciprocate horizontally in the front and rear directions below the ink jet head. A right end of the media tray 81 is supported by a guide shaft 88 that extends horizontally in the front and rear directions, and a left end of the media tray 81 is slidably supported by a guide rail 89 that extends horizontally in the front and rear directions. A driving mechanism of the media tray 81 also includes a timing belt 90 that is provided horizontally in the front and rear direction and a tray motor 91 for driving the timing belt 90.

The media tray 81 includes a circular shallow recess 81a, which is used to mount a CD, on an upper surface of a rectangular plate. In addition, in a central portion of the recess 81a, three vertical pawls 92 to 94 that are arranged at a gap of 60° on the same circle are provided. The two vertical pawls 92 and 93 can move in the radial direction as one body, the remaining vertical pawl 94 is disposed at the fixed position. The two vertical pawls 92 and 93 move by a driving mechanism such as an electromagnetic solenoid (not shown).

As shown in FIG. 9, if a CD is placed on the recess 81a from the above in a state in which a printing surface, such as a label, faces upward, the three vertical pawls 92 to 94 are inserted in a center hole of the CD. Thereafter, if the vertical pawls 92 and 93 slightly move radially outward, the three vertical pawls 92 to 94 are pressed against an inner peripheral surface of the center hole of the CD from the inner side. Thus, the CD is held on the media tray 81. In this state, the tray motor 91 is driven to move the media tray 81 backward along the guide shaft 88, thereby being able to move the media tray 81 up to a printing area of the ink jet head. Thereafter, predetermined printing can be performed on the printing surface of the CD by means of the ink jet head.

(Media Disposal Mechanism)

The media disposal mechanism 23 including a pair of left and right vertical protrusions 96 and 97 is provided on a front plate 95 in the printer chassis 83. These vertical protrusions 96 and 97 can protrude downward by means of a driving mechanism, such as a plunger. If the media tray 81 moves backward or forward in a state in which the protrusions 96 and 97 protrude downward, the CD moves in a state in which front tips of the protrusions 96 and 97 are in contact with the CD. As a result, a recording surface of the CD is mechanically destroyed, and the CD cannot be read.

In addition, the recording surface of the CD may also be mechanically destroyed using an in-and-out operation of the media tray 71 of the media drive 15. Alternatively, the recording surface of the CD may also be mechanically destroyed using a motion of the head carriage 84. Alternatively, the recording surface of the CD may also be mechanically destroyed using a motion of the media carrier 55 of the media conveying mechanism 12.

Moreover, as the media disposal mechanism 23 for making a CD as a discarded CD that cannot be read, a mechanism for chemically destroying a recording surface of the CD or a mechanism for optically destroying the recording surface of the CD may be used in addition to the mechanism for mechanically destroying the recording surface of the CD. The mechanism for chemically destroying a recording surface of a CD includes dissolving or oxidizing the recording surface by coating or spraying special ink on the CD and melting or thermally changing the recording surface of the CD using a heat roller. Furthermore, the optical mechanism includes a mechanism that destroys a recording surface of a CD by irradiating a high-output laser onto the CD recording surface using an optical head of a media drive. In the case of a CD-RW or the like, it is needless to say that all written data can be deleted without destroying a recording surface. Moreover, in the case of a CD-RW or the like, it is possible to make data not readable, for example, by overwriting meaningless data.

Furthermore, it is possible to make data not readable by mounting a CD on the media tray 81 in a state in which a data written surface of the CD faces upward and printing on the data written surface of the CD using the printer 19.

(Operation Mode)

Although writing of a CD and defective media detection and disposal have been briefly described above, the control unit 11 is specifically configured to be able to realize five modes shown below.

<First Processing Mode>

In this mode, data is written into a CD, and the CD is stored inside if the data has been normally written, and the CD is stored inside if the data has not been normally written.

Specifically, the CD 14 stored in the supply-side stacker 13 is supplied to the media drive 15, and writing of data is executed. Then, the media drive 15 determines whether or not the CD after the data writing is a defective CD. As a result of the determination, if the data writing has been normally performed, the CD is stored in the storage-side stacker. On the other hand, a defective CD is processed not to be readable by the media disposal mechanism 23 and is then stored in the storage-side stacker 22. In addition, after checking whether or not the writing has been normally performed, the label printer 19 may print a label or the like on a surface of the CD on which data writing has been normally performed.

<Second Processing Mode>

In this mode, data is written into a CD, and the CD is stored inside if the data has been normally written, and the CD is processed to be ejected if the data has not been normally written.

Specifically, the CD 14 stored in the supply-side stacker 13 is supplied to the media drive 15, and writing of data is executed. Then, the media drive 15 determines whether or not the CD after the writing of data is a defective CD. As a result of the determination, if the data writing has been normally performed, the CD is stored in the storage-side stacker 22. On the other hand, a defective CD is processed not to be readable by the media disposal mechanism 23 and is then ejected, as a CD to be discarded, from the media outlet 25. In addition, after checking whether or not the writing has been normally performed, the label printer 19 may print a label or the like on a surface of the CD on which data writing has been normally performed.

<Third Processing-Mode>

In this mode, a defective CD stored inside is processed to be ejected.

Specifically, a defective CD stored in the storage-side stacker 23 is processed by the media disposal mechanism 23 such that data is not readable, and the defective CD after processing is ejected from the media outlet 25.

<Fourth Processing-Mode>

In this mode, a defective CD stored inside is processed and is then stored inside.

Specifically, a defective CD stored in one of the supply-side stacker 13 and the storage-side stacker 23 is processed by the media disposal mechanism 23 such that data is not readable, and the defective CD after processing is stored in the other one of the supply-side stacker 13 and the storage-side stacker 23. In addition, the defective CD after processing may be stored in the disposal stacker 27.

<Fifth Processing Mode>

In this mode, the disposal stacker 27 is positively utilized.

Specifically, the CD 14 stored in the supply-side stacker 13 is supplied to the media drive 15, and writing of data is executed. Then, the media drive 15 determines whether or not the CD after the data writing is a defective CD. As a result of the determination, if the data writing has been normally performed, the CD is stored in the storage-side stacker 22. On the other hand, a defective CD is processed not to be readable by the media disposal mechanism 23 and is then stored in the disposal stacker 27. In addition, after checking whether or not the writing has been normally performed, the label printer 19 may print a label or the like on a surface of the CD on which data writing has been normally performed.

Using the disposal stacker 27, a normal CD and a defective CD are prevented from being mixed in the storage-side stacker 22. Moreover, it is possible to easily eliminate an unnecessary CD only by removing a defective CD in the disposal stacker 27.

(CD Publication Operation)

Next, an example of a CD publication operation (operation of outputting data to the outside of the in-company LAN (network) 2) in the data management system 1 according to the present embodiment will be described. An operation of the present embodiment will be described using, as an example, a case in which an employee A creates presentation data including secret information, writes the presentation data into a CD-R, and lends the CD-R to a B company who is a client company on a temporary basis for a week.

FIG. 10 is a view schematically explaining a data management flow in the data management system 1 according to the present embodiment.

First, an employee A logs in the client PC 3 on the in-company LAN 2 using his or her ID (step S1). Then, the employee A runs application software used for data creation in order to create data on a screen of the display device 3B (step S2). After creating the data, the created data is uploaded to the management server 4 (step S3) and is stored in the database DB (step S4).

Then, the employee A runs application software for an optical disk publisher in the client PC, designates a label printing template selected for external distribution and created data that is written data, and clicks a CD publication instruction button. If the CD publication instruction button is clicked, a management number will be automatically granted and management information, such as creation date and time, an ID of the employee A, a data name, a client company name, and a lending period, is transmitted to the database DB of the management server 4 to be recorded (step S5).

Next, the employee A asks a boss whether or not the created data can be written into a CD-R and lent to the B company. For example, the employee A runs application software for confirmation in the client PC 3 that the employee A logs in and then transmits an approval request as well as the created data, the client company name, the lending period, and the like to another client PC that a boss (manager) logs in through the in-company LAN 2, for example (step S6). When the boss receives the approval request in another client PC, the boss checks the contents on the screen (step S7) and approves the request if there is no problem. If the request is approved, approval information is transmitted to the client PC of the employee A (step S8), and the created data is transmitted to the optical disk publisher 5 (step S9).

When the created data is received, the optical disk publisher 5 operates as described above to write the created data into a CD-R. Moreover, information including a title, a management number, date and time of creation, a company logo, and 'CONFIDENTIAL' is printed on a label surface of the CD-R (step S10). In addition, the management number, the date and time of creation, an ID of the employee A, and created data name are herein recorded as CD publication history information in the optical disk publisher 5. In addition, the optical disk publisher 5 may perform a security technique, such as copy guard and encryption, on the published CD using a known method, such that duplication of data, data access not performed by a user who is allowed to access the data, and so on are prevented beforehand.

The employee A leaves the client PC 3 and moves to a place where the optical disk publisher 5 is positioned in order to take out the published CD-R. Then, the employee A inputs authentication information, such as the ID of the employee A (step S11). If an individual authentication unit of the optical disk publisher 5 approves of the authentication information, the published CD-R may be taken out from the media outlet 58 of the optical disk publisher 5, thereby completing publication of the CD (step S12). Then, CD publication history information is transmitted to the management server 4 and is recorded in the database DB (step S13). The employee A lends the CD-R, which is published as described above, to the B company on a temporary basis for a week.

Here, an operation of publishing a CD-R in the optical disk publisher 5 will be described in detail. The blank CD-R 14 is stored in the supply-side stacker 13 of the optical disk publisher 5. When a driving command is received from the management server 4, the media carrier 55 of the media conveying mechanism 12 rises up to the uppermost position, rotates up to right above the supply-side stacker 13, and then moves down to hold a blank CD-R 14. Thereafter, the media carrier 55 moves up and rotates to move right above the media tray 71 in a pulled state. Then, the media carrier 55 moves down to pass the blank CD-R 14 to the media tray 71. The media tray 71 that has received the blank CD-R 14 is guided to the media drive 15, and an operation of writing data is performed.

After the data writing, an operation of reading the written data is performed to distinguish whether or not the data writing has been normally performed. In any cases in which the writing is normal or poor, the normal CD-R 17 or the defective CD-R 18 is handed over to the media carrier 55 of the media conveying mechanism 12 from the media tray 71 and then moves right above the lower media tray 81 by causing the media carrier 55 to rotate, move, and rotate. Then, the CD-R 17 or the CD-R 18 is handed over to the media tray 81.

In the case of the normal CD-R 17, the media tray 81 moves backward, and predetermined printing is performed on a printing surface of the CD-R 17 by an ink jet head as described above. The CD-R 20 after printing is conveyed right above the storage-side stacker 22 by the media carrier 55 of the media conveying mechanism 12 and is then stored in the stacker 22. If the employee A requests that the stored CD-R 20 be taken out as described above, the requested CD-R 20 is taken out by the media carrier 55 of the media conveying mechanism 12 and is published from the media outlet 25.

On the other hand, in the case of the defective CD-R 18, the defective CD-R 18 is stored in a state in which the vertical pawls 96 and 97 of the media disposal mechanism 23 protrude downward when the media tray 81 moves backward. As a result, while the media tray 81 is moving backward, a recording surface of the defective CD-R 18 is damaged by the vertical pawls 96 and 97. Moreover, even when the media tray 81 that has moved backward moves forward again up to the previous position, the recording surface is damaged by the vertical pawls 96 and 97. As a result, the recording surface of the defective CD is mechanically destroyed and disposed of so as not to be readable. Thus, the defective CD-R 18 whose recording surface has been destroyed is ejected as the CD-R 24, which is to be discarded, from the media outlet 25.

A defective CD-R is disposed of, a signal indicating the end of disposal is transmitted to the management server 4. In the management server 4, disposal history information indicating that the CD-R corresponding to a disposal management number has been disposed of is recorded.

Furthermore, whether or not the media is normal may also be determined after printing is performed by the label printer 19. In this case, it is preferable to observe a printing surface using an image recognition means or the like and determine whether or not the media is normal on the basis of whether or not the print position has shifted.

Furthermore, in the case of not performing the printing, preferably, a printing operation using the label printer 19 is omitted, and normal media is stored in the storage-side stacker 22 immediately after data writing is performed by the media drive 15.

OTHER EMBODIMENTS

In the example described above, blank media are stored in the supply-side stacker 13 of the optical disk publisher 5, and published data is stored in the storage-side stacker 22. However, the optical disk publisher 5 may be used as a disposal machine for disposing of defective media.

In this case, for example, it is preferable to store defective media in the supply-side stacker 13, take out the defective media one by one from the supply-side stacker 13, dispose of the defective media using the media disposal mechanism 23, and store discarded media after the disposal in the storage-side stacker 22. In addition, it is preferable to open the door 32 after completing disposing of the defective media in the supply-side stacker 13, such that the media to be discarded is taken out from the storage-side stacker 22. It is needless to say that media to be discarded can be ejected from the media outlet 25 whenever defective media is disposed.

On the other hand, in the example described above, the system is configured such that data can be output to the outside through the optical disk publisher, in order to make explanation and understanding easy. In addition, the system may be configured to be connected to another network or configured such that data can be output to the outside by mail through Internet or the like. In such a case, existing security measures may be taken corresponding to, for example, a confidential level of data.

Further, in the example described above, all data on a network is managed by the management server 4 in a unified manner. Alternatively, only a part of the data may be managed by the management server 4 in a unified manner.

Furthermore, even in a case in which management data of the management server 4 is written into a CD, a DVD, and the like to be stored in the CD storage device 6, it is preferable to build document management software such that all data can be searched by accessing the management server 4.

A plurality of optical disk publishers may be connected to a network such that, for example, data that can be published by the individual optical disk publishers is distinguished corresponding to a confidential level or the like.

In addition, as external recording media, it is possible to use media based on other formats, such as a semiconductor memory and a magnetic recording medium, as well as an optical disk, such as a CD and a DVD, and a magneto-optic disk. In addition, as for an external recording medium writing device, it is possible to use an external recording medium writing device that performs writing and publication operations on external recording media based on a single format or an external recording medium writing device having a function of performing writing and publication operations on external recording media based on different formats.

DESCRIPTION OF REFERENCE NUMERALS AND SIGNS

Figure 1:
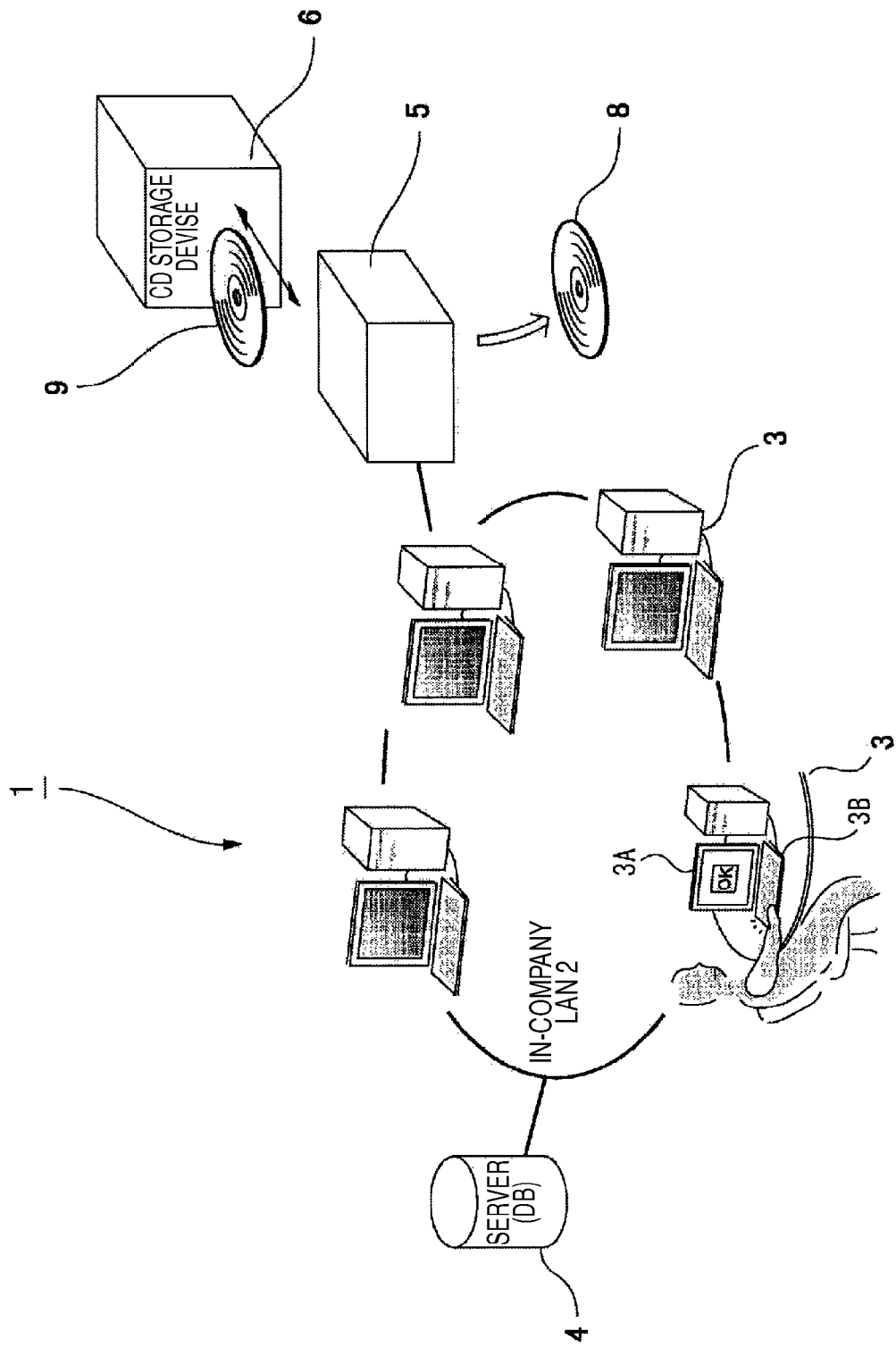
FIG. 1 is a view schematically illustrating the configuration of a data management system to which the invention is applied.
Figure 2:
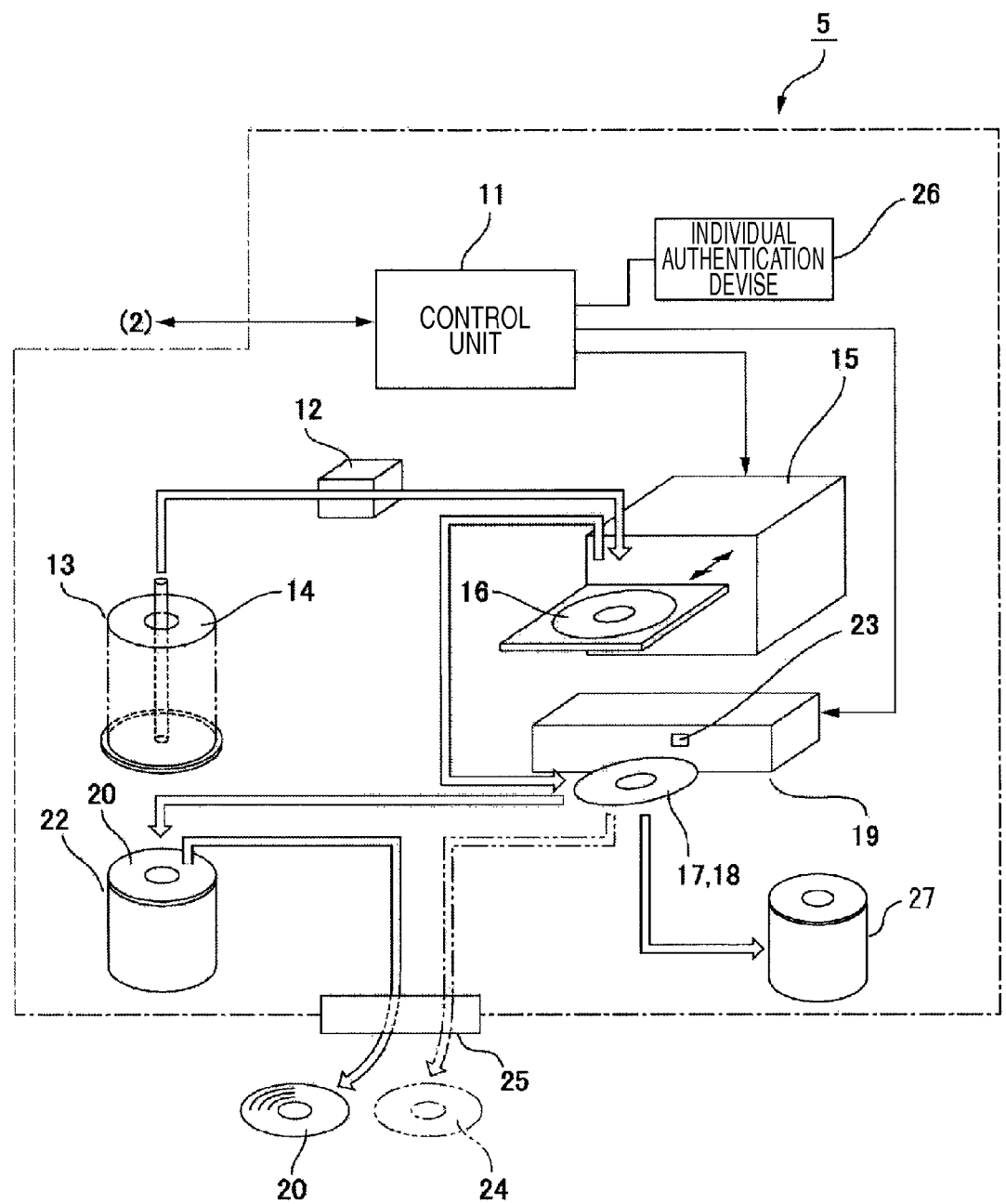
FIG. 2 is a view schematically illustrating the configuration of an optical disk publisher shown in FIG. 1.
Figure 3:
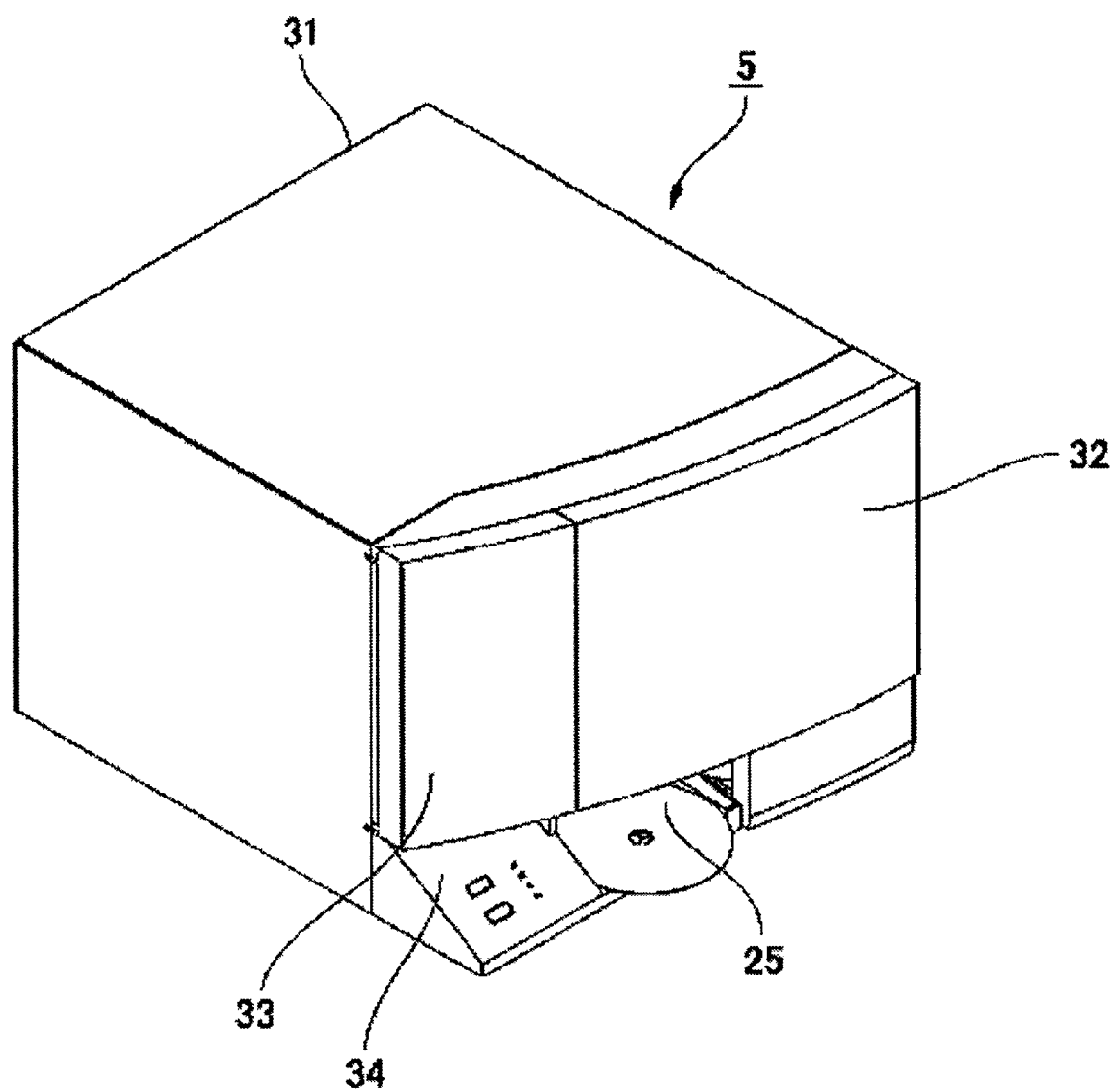
FIG. 3 is a perspective view illustrating an outer appearance of the optical disk publisher shown in FIG. 1.
Figure 4:
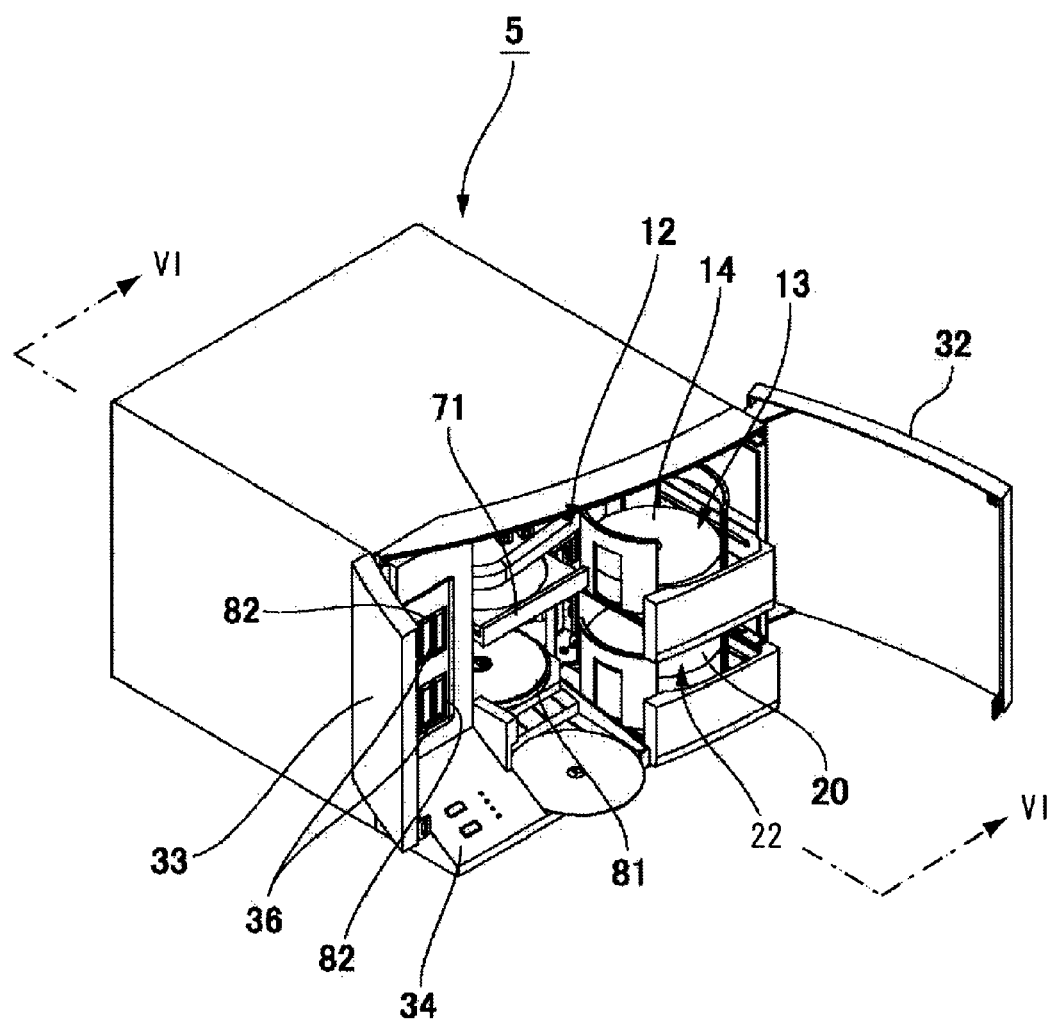
FIG. 4 is a perspective view illustrating the optical disk publisher shown in FIG. 3 in a state where doors are opened.
Figure 5:
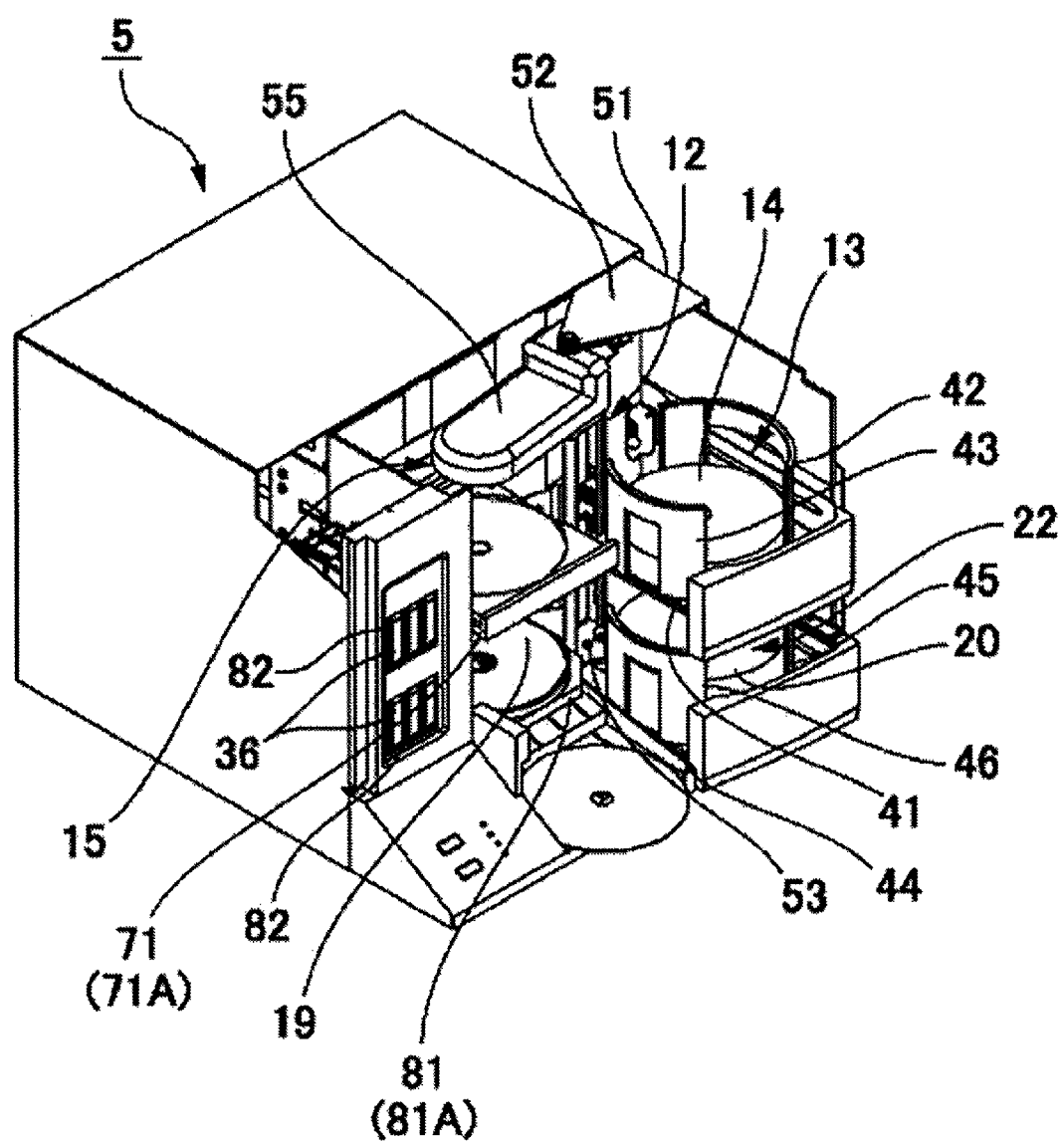
FIG. 5 is a perspective view illustrating the inner structure of the optical disk publisher shown in FIG. 3.
Figure 6:
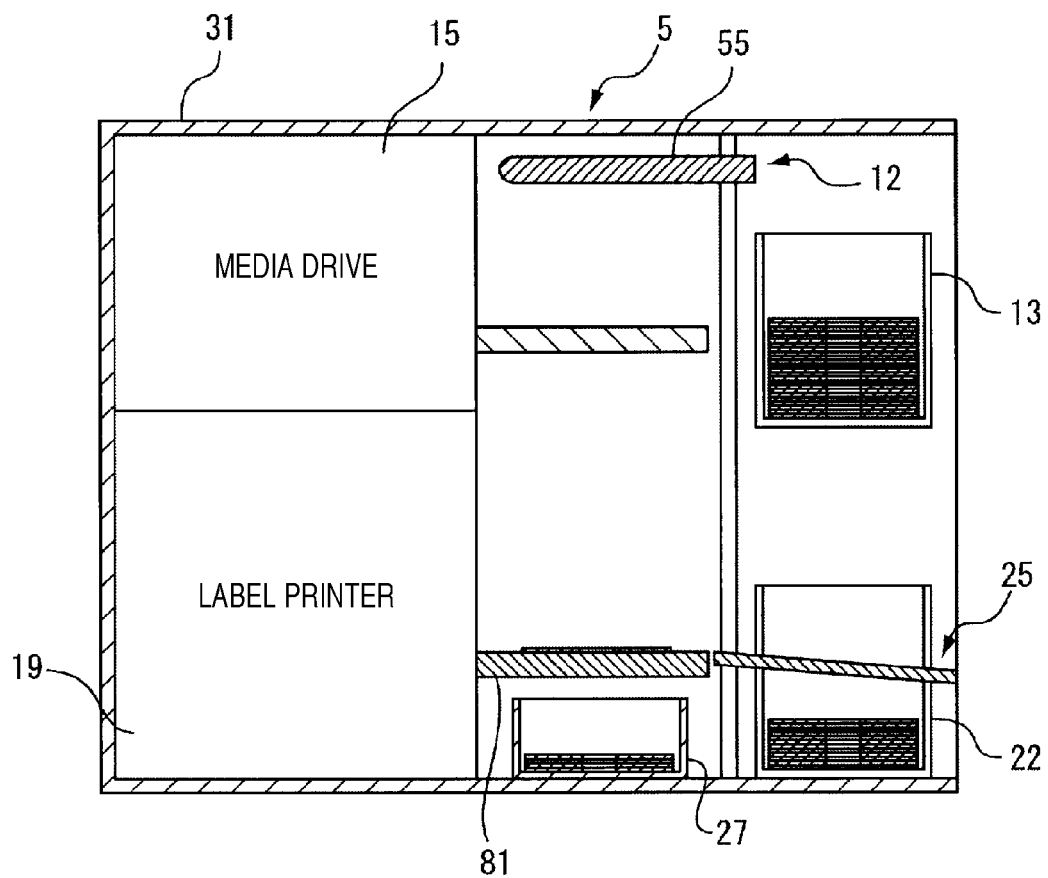
FIG. 6 is a cross-sectional view taken along the line VI-VI of FIG. 4.
Figure 7:
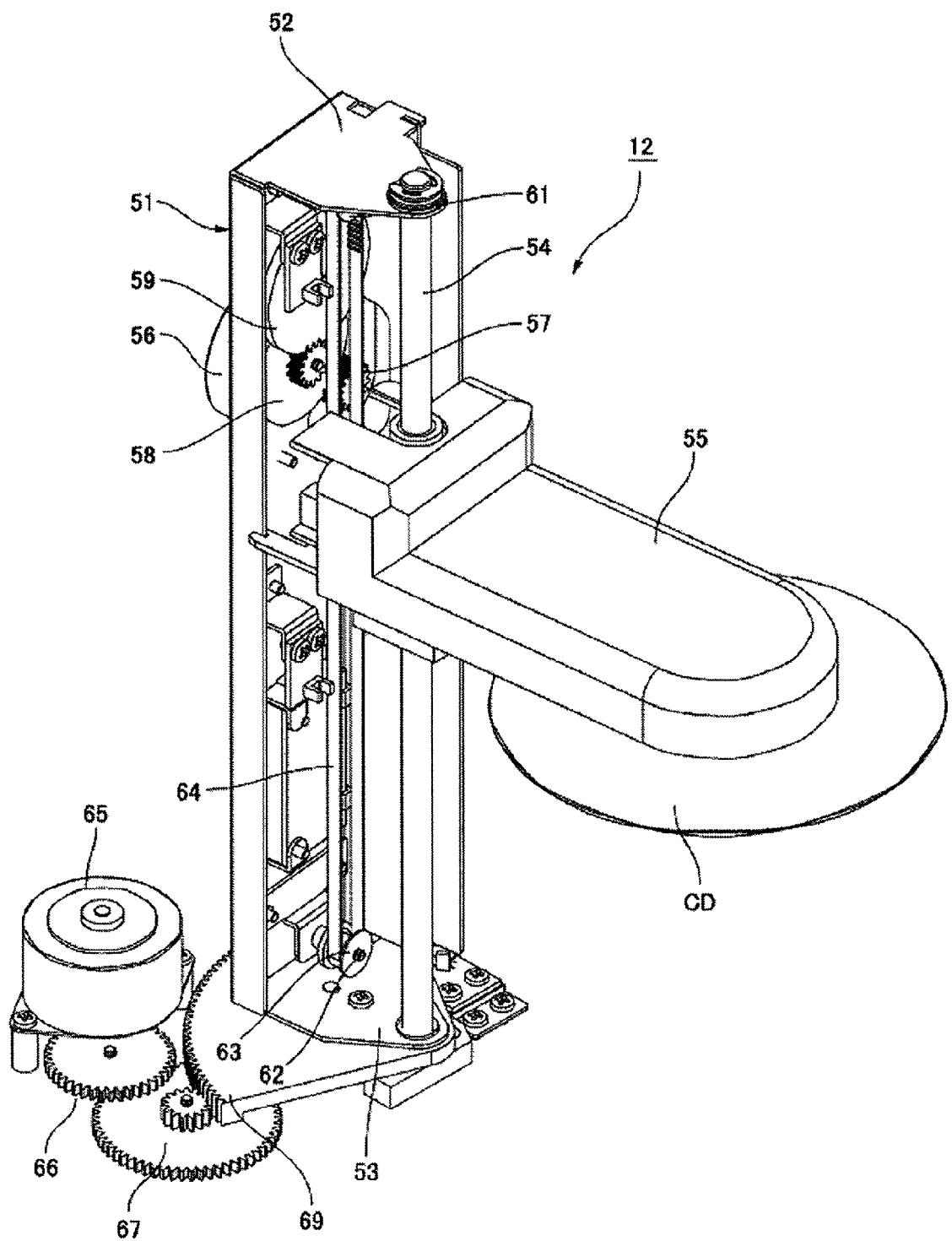
FIG. 7 is a perspective view illustrating a media conveying mechanism of the optical disk publisher shown in FIG. 3.
Figure 8:
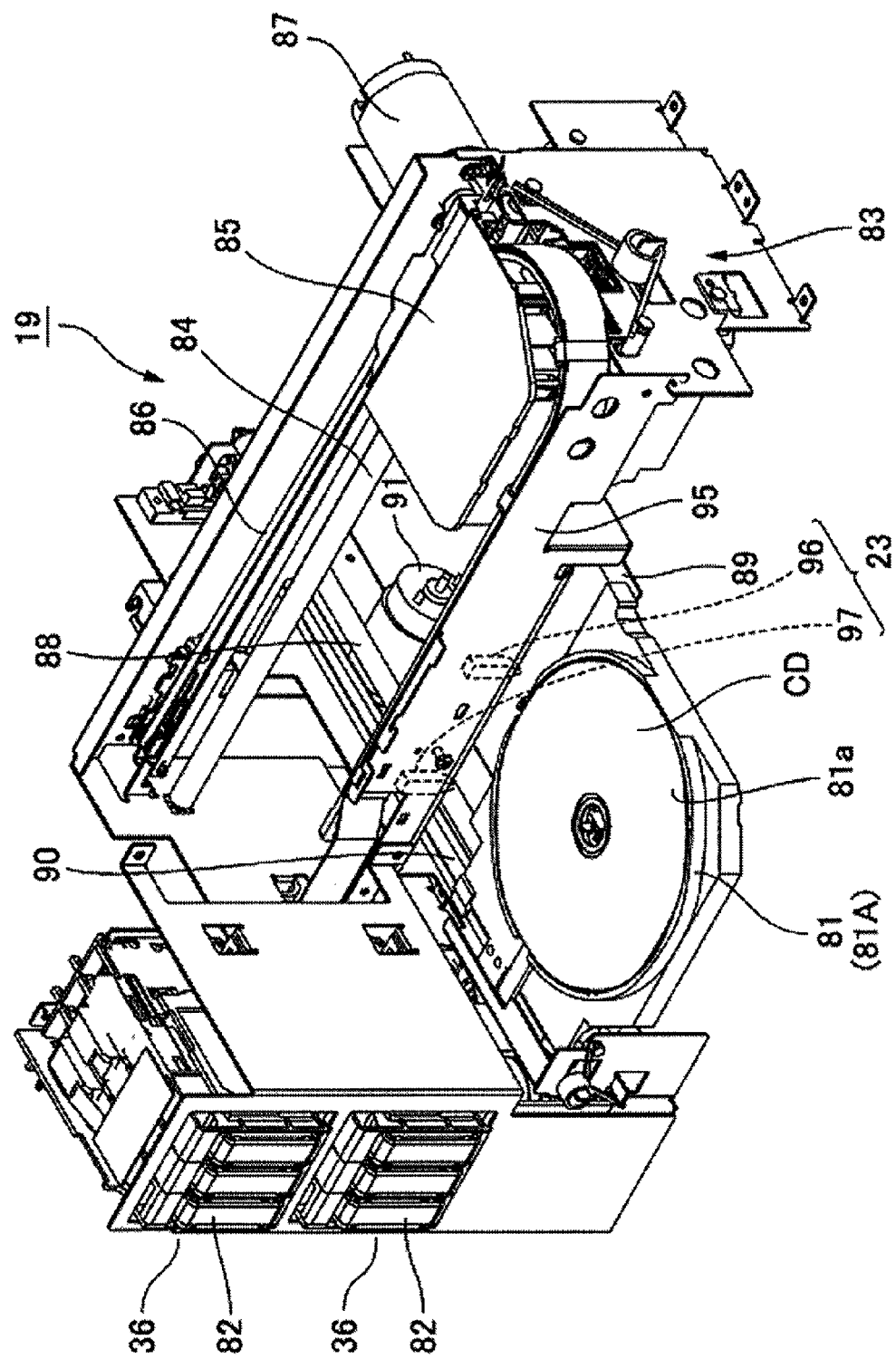
FIG. 8 is a perspective view illustrating a printer of the optical disk publisher shown in FIG. 3.
Figure 9:
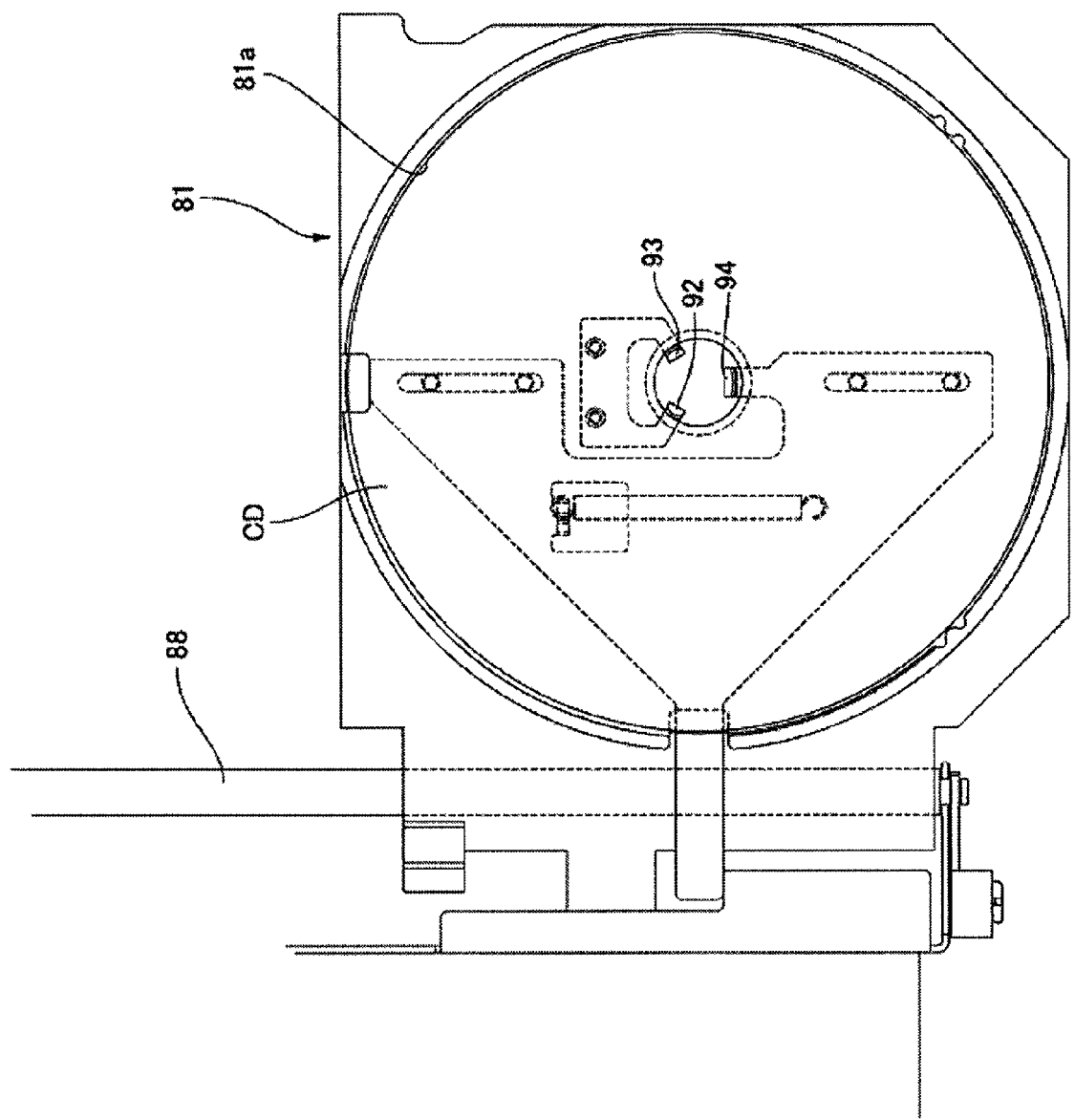
FIG. 9 is a plan view illustrating a media tray 81 of a printer shown in FIG. 8.
Figure 10:
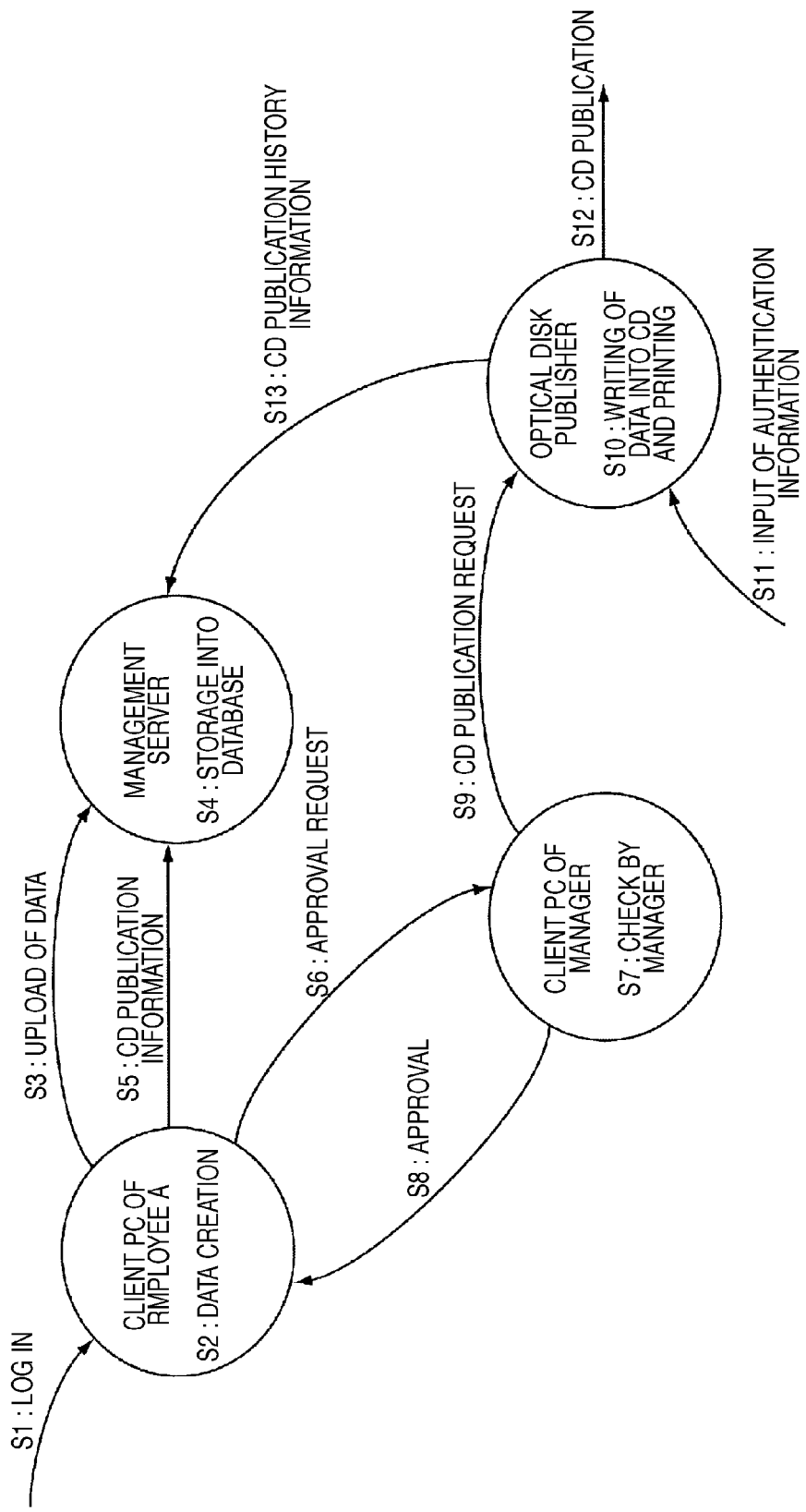
FIG. 10 is a view schematically explaining a data management flow in a data management system.

1: data management system
2: in-company LAN
3: client PC
4: management server 5: optical disk publisher
6: CD storage device
11: control unit
12: media conveying mechanism
13: supply-side stacker
14: blank media
15: media drive
16, 17, 18, 20: media
19: printer
20: media
22: storage-side stacker
23: media disposal mechanism
24: media to be discarded
25: media outlet
31: housing
32, 33: door
34: operation surface
36: cartridge mounting part

The invention claimed is:

1. A media processor comprising:
a media drive that performs writing of data and reading of data on plate-shaped media;
a defective media detection unit that detects defective media on which a failure in data writing is performed by the media drive;
a media disposal mechanism that disposes of the defective media such that data is not readable from the defective media when the defective media is detected;
a media conveying mechanism for conveying the media; and
a control unit that controls the media drive, the media disposal mechanism, and the media conveying mechanism,
wherein the media disposal mechanism is provided in one of the media drive and the media conveying mechanism.

2. The media processor according to claim 1, further comprising:
a media outlet for ejecting media,
wherein writing-completed media into which data has been normally written is published from the media outlet, and discarded media disposed of by the media disposal mechanism is ejected from the media outlet.

3. The media processor according to claim 1, further comprising:
a first media stacker, a second media stacker, and a discarded media stacker for respectively storing media.

4. The media processor according to claim 3, wherein the control unit makes a control such that the media drive writes data into media stored in the first media stacker, the defective media detection unit determines whether or not media after the data writing is defective media, and the media conveying mechanism causes normal media on which data writing has been normally performed to be stored in the second media stacker and causes the defective media to be disposed of by the media disposal mechanism and then stored in the second media stacker.

5. The media processor according to claim 4, wherein the control unit makes a control such that the media drive writes data into media stored in the first media stacker, the defective media detection unit determines whether or not media after the data writing is defective media, and the media conveying mechanism causes normal media on which data writing has been normally performed to be stored in the second media stacker and causes the defective media to be disposed of by the media disposal mechanism and then ejected as discarded media from the media outlet.

6. The media processor according to claim 3, wherein the control unit makes a control such that the media disposal mechanism disposes of media stored in one of the first and second media stackers, and the media conveying mechanism causes discarded media after the disposal to be ejected from the media outlet.

7. The media processor according to claim 3, wherein the control unit makes a control such that the media disposal mechanism disposes of media stored in one of the first and second media stackers, and the media conveying mechanism causes discarded media after the disposal to be stored in the other one of the first and second media stackers.

8. The media processor according to claim 3, wherein the control unit makes a control such that the media drive writes data into media stored in one of the first and second media stackers, the defective media detection unit determines whether or not media after the data writing is defective, and the media conveying mechanism causes the normal media to be stored in the other one of the first and second media stackers and causes the defective media to be disposed of by the media disposal mechanism and then stored in the discarded media stacker.

9. The media processor according to claim 1, wherein the media disposal mechanism is a mechanism that destroys a data recording layer of media using an optical means, a chemical means, a mechanical means, or a means obtained by combination thereof.

10. The media processor according to claim 9, wherein the media disposal mechanism disposes of media using a motion of a movable part of the media drive or the media conveying mechanism.

11. A media processor comprising:
a media drive that performs writing of data and reading of data on plate-shaped media;
a defective media detection unit that detects defective media on which a failure in data writing is performed by the media drive;
a media disposal mechanism that disposes of the defective media such that data is not readable from the defective media when the defective media is detected;
a media conveying mechanism for conveying the media;
a control unit that controls the media drive, the media disposal mechanism, and the media conveying mechanism; and
a printer that prints a label on media surfaces,
wherein the printer performs printing on media on which data writing has been normally performed, and
wherein the media disposal mechanism is provided in the printer.

12. The media processor according to claim 11, wherein the media disposal mechanism is a mechanism that performs printing on data-reading-side surfaces of media so as not to be readable.

13. The media processor according to claim 11, wherein the media disposal mechanism mechanically disposes of media using a motion of a movable part of the printer.

14. The media processor according to claim 11, wherein the control unit causes at least one of (1) the media drive to perform an operation of writing media identification information and (2) the printer to perform an operation of printing the media identification information and storing or outputting to the outside, media identification information which is assigned to media disposed of by the media disposal mechanism.

* * * * *